(12) United States Patent
Morita et al.

(10) Patent No.: US 11,888,645 B2
(45) Date of Patent: Jan. 30, 2024

(54) INFORMATION PROCESSING DEVICE AND MANAGEMENT DEVICE

(71) Applicant: HITACHI ASTEMO, LTD., Hitachinaka (JP)

(72) Inventors: Nobuyoshi Morita, Tokyo (JP); Hiroki Yamazaki, Hitachinaka (JP); Kota Ideguchi, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 429 days.

(21) Appl. No.: 17/284,489

(22) PCT Filed: Oct. 10, 2019

(86) PCT No.: PCT/JP2019/040100
§ 371 (c)(1),
(2) Date: Apr. 12, 2021

(87) PCT Pub. No.: WO2020/080259
PCT Pub. Date: Apr. 23, 2020

(65) Prior Publication Data
US 2021/0377073 A1 Dec. 2, 2021

(30) Foreign Application Priority Data
Oct. 17, 2018 (JP) .................... 2018-196082

(51) Int. Cl.
*H04L 12/40* (2006.01)
*H04L 7/00* (2006.01)
*H04L 9/40* (2022.01)

(52) U.S. Cl.
CPC ...... *H04L 12/40104* (2013.01); *H04L 7/0054* (2013.01); *H04L 63/1466* (2013.01); *H04L 2012/40215* (2013.01)

(58) Field of Classification Search
CPC ............. H04L 12/40104; H04L 7/0054; H04L 63/1466; H04L 2012/40215; H04L 12/40097
See application file for complete search history.

(56) References Cited

U.S. PATENT DOCUMENTS 6,247,059 B1 * 6/2001 Johnson .............. H04L 12/1868
714/48
10,735,517 B2 * 8/2020 Banno ..................... H04L 9/002
(Continued)

FOREIGN PATENT DOCUMENTS

JP  2013-098719 A  5/2013
JP  2017-038365 A  2/2017
(Continued)

OTHER PUBLICATIONS

Morita, Nobuyoshi, "A Method of Resynchronization of the Communication Sequence Number for Automotive Networks," CSS2016, Proceedings of Computer Security Symposium 2016, Human resource development workshop of joint meeting of malware countermeasure research, Nov. 2, 2016 (accession date), vol. 2016, pp. 384-390.
(Continued)

*Primary Examiner* — Abiy Getachew
(74) *Attorney, Agent, or Firm* — Volpe Koenig

(57) ABSTRACT

An information processing device which transmits and receives a message to which a communication ID indicating a class has been assigned, includes: a storage unit which stores, for each of the communication IDs, a communication counter for verifying a recency of a communication; a recency information management unit which updates the communication counter based on a predetermined condition; an abnormality monitoring unit which identifies an influence range of an abnormality that occurred; and a message generation unit which generates a synchronization request message including the communication ID indicating that it (Continued)

is a message requesting a synchronization of the communication counter, and a synchronization target identifier indicating the influence range identified by the abnormality monitoring unit.

8 Claims, 12 Drawing Sheets

(56) References Cited

U.S. PATENT DOCUMENTS

| | | | |
|---|---|---|---|
| 2014/0310530 A1 | 10/2014 | Oguma et al. | |
| 2015/0143488 A1* | 5/2015 | Takehara | H04L 63/08 |
| | | | 726/6 |
| 2018/0219872 A1* | 8/2018 | Sugashima | H04L 63/08 |
| 2018/0219873 A1 | 8/2018 | Sugashima et al. | |

FOREIGN PATENT DOCUMENTS

| | | |
|---|---|---|
| JP | 2017-091280 A | 5/2017 |
| WO | 2017/026360 A1 | 2/2017 |

OTHER PUBLICATIONS

International Search Report, PCT/JP2019/040100, dated Dec. 17, 2019, 2 pgs.

* cited by examiner

FIG. 2

| TYPE | SLOT ID | COMMUNICATION ID / DEVICE ID |
|---|---|---|
| COMMUNI-CATION ID SLOT | 1 | 0x001 |
| | 2 | 0x012 |
| | 3 | 0x252 |
| | 4 | 0x7ff |
| DEVICE ID SLOT | 1 | abcdef1234 |
| | 2 | pqrs5678 |
| | 3 | qwertyu |
| | 4 | zxcvbnm |

FIG. 3

| | | 191 | |
|---|---|---|---|
| INFLUENCE RANGE INFORMATION ||||
| 1911 | 1912 | 1913 | 1914 |
| ABNORMALITY CODE | ABNORMALITY DESCRIPTION | ABNORMALITY INFLUENCE RANGE CODE | INFLUENCE RANGE |
| 0x001 | CONSECUTIVE FAILURE OF MAC VERIFICATION OF COMMUNICATION MESSAGE | 0xf01 | COMMUNICATION ID |
| ... | ... | ... | ... |
| 0x101 | UNEXPECTED POWER LOSS | 0xf02 | INFORMATION PROCESSING DEVICE |
| 0x102 | UNEXPECTED RESET | | |
| 0x103 | COMMUNICATION DISRUPTION EXCEEDING GIVEN PERIOD | | |
| ... | ... | ... | ... |
| 0x201 | CRITICAL FAILURE | 0xf03 | IN-VEHICLE SYSTEM (NO SYNCHRONIZATION) |
| ... | ... | ... | ... |

| | RECENCY-RELATED INFORMATION 192 | |
|---|---|---|
| COMMUNICATION ID 1921 | RECENCY INFORMATION (UPPER BIT \|\| LOWER BIT) 1923 | |
| | SYNCHRONIZATION COUNTER 1924 | COMMUNICATION COUNTER 1925 |
| 0 x 0 0 1 | $SC_1$ | $C_1$ |
| 0 x 0 0 2 | $SC_2$ | $C_2$ |
| 0 x 0 1 0 | $SC_{10}$ | $C_{10}$ |
| 0 x 0 1 4 | $SC_{14}$ | $C_{14}$ |
| 0 x 0 1 5 | $SC_{15}$ | $C_{15}$ |
| ... | ... | ... |

FIG. 7

| COMMUNICATION-RELATED INFORMATION 193 | |
|---|---|
| COMMUNICATION ID 1931 | COMMUNICATION DESTINATION INFORMATION PROCESSING DEVICE 1932 |
| 0 x 0 0 1 | FIRST INFORMATION PROCESSING DEVICE 1A |
| 0 x 0 0 d | SECOND INFORMATION PROCESSING DEVICE 1B |
| 0 x 0 1 0 | FIRST INFORMATION PROCESSING DEVICE 1A |
| 0 x 0 1 4 | FIRST INFORMATION PROCESSING DEVICE 1A |
| ... | ... |

INFORMATION PROCESSING DEVICE AND MANAGEMENT DEVICE

TECHNICAL FIELD

The present invention relates to an information processing device and a management device.

BACKGROUND ART

As a representative standard protocol in an in-vehicle network of automobiles, a CAN (Controller Area Network) (registered trademark) is in widespread use. With this kind of in-vehicle network, for instance, there is a risk of an illegal device being connected to an interface such as an OBD2 (On-Board-Diagnostics 2) port which is directly connected to the in-vehicle network, and an illegal message being transmitted to the in-vehicle network. The communication data of the CAN does not have a field indicating the origin (source address), impersonation is easy, and is particularly vulnerable to replay attacks. A replay attack is the attack of wiretapping messages being transmitted on the communication path and acquiring such messages in advance, and causing illegal operations by retransmitting the acquired messages.

Normally, in order to deal with this kind of threat, it is effective to utilize a message authentication code (MAC) as a falsification detection code in the message being transmitted between the respective information processing devices, and perform message authentication by also giving consideration to measures against retransmission attacks. Nevertheless, when applying message authentication which gives consideration to measures against retransmission attacks in an in-vehicle system, for example, when an abnormality, such as an unexpected reset operation, occurs in the information processing device, the synchronization of the communication counter values being shared between the information processing device in a transmission/reception relationship will become unsynchronized. As a result, there is a problem in that the information processing device will not be able to properly verify the received message.

PTL 1 discloses a communication system comprising a plurality of nodes connected to each other, wherein each node generates a message authentication code by using a count value of a counter, and a message transmitted and received between the nodes is verified by using the message authentication code, the communication system comprising: an upper count value retention unit in which one of the nodes is deemed a management node, the nodes that transmit and receive the message are deemed a normal node, an upper side upon dividing the count value of the counter into halves is deemed an upper count value and a lower side thereof is deemed a lower count value, and the management node retains the upper count value; an upper count value updating unit which updates the upper count value according to a pre-set upper updating condition; and an upper count value distribution unit which distributes the upper count value retained in the upper count value retention unit to the normal node according to a pre-set distribution condition, wherein the normal node comprises a count value retention unit which retains the count value; a lower updating unit which updates the lower count value retained in the count value retention unit according to a pre-set lower updating condition; an upper updating unit which updates the upper count value retained in the count value retention unit by using the upper count value distributed from the management node; and a lower initialization unit which initializes the lower count value when the upper count value is updated by the upper updating unit.

CITATION LIST

Patent Literature

[PTL 1] Japanese Unexamined Patent Application Publication No. 2017-38365

SUMMARY OF THE INVENTION

Problems to be Solved by the Invention

With the invention described in PTL 1, it is not possible to target only a specific device to be synchronized.

Means to Solve the Problems

According to the 1st aspect of the present invention, an information processing device which transmits and receives a message to which a communication ID indicating a class has been assigned, includes: a storage unit which stores, for each of the communication IDs, a communication counter for verifying a recency of a communication; a recency information management unit which updates the communication counter based on a predetermined condition; an abnormality monitoring unit which identifies an influence range of an abnormality that occurred; and a message generation unit which generates a synchronization request message including the communication ID indicating that it is a message requesting a synchronization of the communication counter, and a synchronization target identifier indicating the influence range identified by the abnormality monitoring unit.

According to the 2nd aspect of the present invention, a management device which relays a communication of communication segments to which the information processing device according to the 1st aspect is connected, wherein: a plurality of the information processing devices are disposed by being divided into two or more segments; the management device includes: a communication unit which communicates with each of the two or more segments; and a transfer unit which, upon receiving the synchronization request message, transfers the synchronization request message only to the segment to which belongs the information processing device to synchronize the communication counter based on the synchronization request message.

Advantageous Effects of the Invention

According to the present invention, it is possible to target only a specific device to be synchronized.

BRIEF DESCRIPTION OF DRAWINGS

FIG. 2 is a diagram showing an example of the information stored in the RAM 19B.

FIG. 3 is a diagram showing an example of the influence range information 191.

FIG. 7 is a diagram showing an example of the communication-related information 193.

FIG. 11 is a configuration diagram of a network N including the information processing device 1 according to the second embodiment.

DESCRIPTION OF EMBODIMENTS

First Embodiment

The first embodiment of the information processing device is now explained with reference to FIG. 1 to FIG. 10.

Configuration

Figure 1:
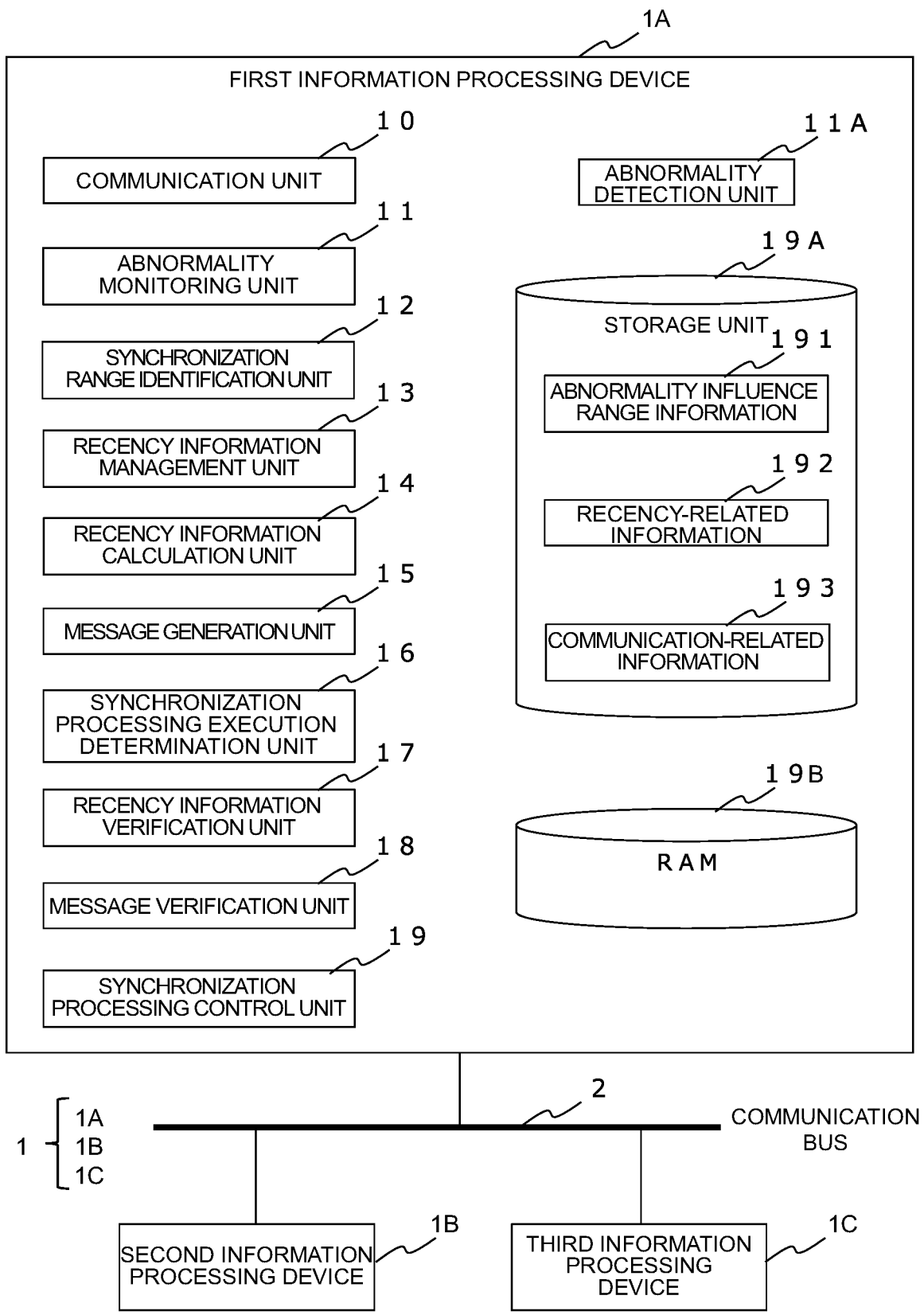
FIG. 1 is a diagram showing a configuration of the information processing device 1 according to the first embodiment.

FIG. 1 is a diagram showing a configuration of the information processing device 1 according to the first embodiment. A first information processing device 1A, a second information processing device 1B and a third information processing device 1C are mutually connected via a communication bus 2. However, the first information processing device 1A, the second information processing device 1B, and the third information processing device 1C are configured in the same manner. In the following explanation, when the first information processing device 1A, the second information processing device 1B, and the third information processing device 1C are not specifically differentiated, they are collectively referred to as "information processing device 1". Moreover, while FIG. 1 shows three information processing devices 1, four or more information processing devices 1 may also be connected.

The communication bus 2 corresponds, for example, to a CAN. A message that flows through the communication bus 2 is assigned a communication ID indicating the class of that message. A message is, for example, a CAN frame, and a communication ID is, for example, a CAN-ID. In other words, a message is synonymous with a frame, a datagram, a packet or the like.

The information processing device 1 comprises a communication unit 10, an abnormality monitoring unit 11, an abnormality detection unit 11A, a synchronization range identification unit 12, a recency information management unit 13, a recency information calculation unit 14, a message generation unit 15, a synchronization processing execution determination unit 16, a recency information verification unit 17, a message verification unit 18, a synchronization processing control unit 19, a storage unit 19A, and a RAM 19B. The communication unit 10 receives message from other information processing devices 1 and transmits messages to other information processing devices 1 via the communication bus 2.

The synchronization recovery processing-related information storage unit 19A stores influence range information 191, recency-related information 192, and communication-related information 193 which are information related to the synchronization recovery processing. The influence range information 191 is information indicating the detected abnormality and the range influenced by that abnormality. The recency-related information 192 is information in which a synchronization counter to be updated during the synchronization recovery processing described later, and a communication counter to be updated each time communication is performed, are each recorded for each communication ID. The communication-related information 193 is information indicating the device to receive the communication for each communication ID.

The influence range information 191 and the communication-related information 193 may be of subject matter that is common among all information processing devices 1 connected to the communication bus 2, or may include information which is essential for each information processing device 1. In the scope explained in this embodiment, the information stored in the influence range information 191 and the communication-related information 193 is fixed; in other words, it is not updated. With the recency-related information 192, values are independently updated for each information processing device 1. More specifically, a value of the synchronization counter and a value of the communication counter are updated for each information processing device 1. Note that, so as long as the processing is being performed normally, all information processing devices 1 will have the same value.

Allocated in the RAM 19B are a a plurality of communication ID slots and a plurality of device ID slots, which are storage areas, and a communication ID and a device ID are stored therein, respectively. The information stored in the RAM 19B is the same in all information processing devices 1 connected to the communication bus 2. Thus, by preparing only a few slots and storing, in each slot, information that is longer than the identifying information of the slot, the total amount of communication data that flows though the communication bus 2 can be reduced. An example of the information stored in the RAM 19B will be described later. However, the information to be stored in the RAM 19B may also be stored in a cache memory of a CPU not shown or the storage unit 19A.

The abnormality monitoring unit 11 detects an abnormality based on the influence range information 191. The abnormality detection unit 11A detects an abnormality and then creates an abnormality code 1911 described later. The synchronization range identification unit 12 uses the influence range information 191 and identifies a synchronization range. The recency information management unit 13 manages the recency-related information 192. The recency information calculation unit 14 calculates new recency information within the range designated by the synchronization range identification unit 12. The message generation unit 15 generates a message including control data or a message including a synchronization request to be transmitted to the other information processing devices via the communication unit 10. In the following explanation, a message including a synchronization request is referred to as a "synchronization request message". A specific example of the synchronization request message will be described later. Moreover, in this embodiment, any message other than the synchronization request message is referred to as a "normal message".

The synchronization processing execution determination unit 16 determines whether the received synchronization request message is related to itself. The recency information verification unit 17 verifies the recency of the received message. The message verification unit 18 verifies the completeness of the communication message. The synchronization processing control unit 19 registers, as new recency information, the value of the recency-related information 192 that is set according to predetermined rules using the recency information management unit 13 when the various verification results are correct. The communication counter included in the recency-related information 192 is read from a nonvolatile memory into a volatile memory when it is activated, and may be stored in the nonvolatile memory when it is deactivated.

The communication unit 10 is configured, for example, by including hardware for performing communication such as a communication module corresponding to a CAN. The storage unit 19A is a non-volatile storage device such as a flash memory.

The abnormality monitoring unit 11, the abnormality detection unit 11A, the synchronization range identification unit 12, the recency information management unit 13, the recency information calculation unit 14, the message generation unit 15, the synchronization processing execution determination unit 16, the recency information verification unit 17, the message verification unit 18, and the synchronization processing control unit 19 are realized by a CPU, which is a central processing unit (not shown) equipped in the information processing device 1, executing programs. The respective programs may be stored in advance in a memory (not shown) or a ROM (Read Only Memory) in the information processing device 1, or, by providing an input/output interface to the information processing device 1 in advance, the respective programs may also be read into a nonvolatile memory or a ROM from other devices via a medium that can be used by the input/output interface and the information processing device 1 as needed. Here, a "medium" means, for example, a storage medium that can be attached to and detached from the input/output interface, or a communication medium (that is, a wired, wireless or optical network, or carrier waves or digital signals that propagate through such network).

However, the abnormality monitoring unit 11, the abnormality detection unit 11A, the synchronization range identification unit 12, the recency information management unit 13, the recency information calculation unit 14, the message generation unit 15, the synchronization processing execution determination unit 16, the recency information verification unit 17, the message verification unit 18, and the synchronization processing control unit 19 may also be realized with an FPGA (Field Programmable Gate Array), which is a rewritable logic circuit, or an ASIC (Application Specific Integrated Circuit), which is an integrated circuit for a specific application. Moreover, these may be realized with a combination of a different configuration in substitute for the combination of a CPU, a ROM, and a RAM; for instance, the combination of a CPU, a ROM, a RAM and an FPGA.

Slot

FIG. 2 is a diagram showing an example of the information stored in the RAM 19B. The RAM 19B stores, regard to the communication ID slot and the device ID slot, respectively, a combination of a slot ID and a communication ID, and a combination of a slot ID and a device ID. For example, there are slot IDs 1 to 16 that can be expressed in 4 bits, and the information quantity of the communication ID or the device ID corresponding to each slot ID; that is, the bit length of the corresponding data, is longer than the bit length of the slot ID.

The communication ID is information having a predetermined length and, for example, has a length of 11 bits. Here, considered is a case of including information of the communication ID in the payload of the communication message. When including the communication ID as is in the payload, the payload will invariably be 11 bits or more. Nevertheless, when the slot ID of the communication ID slot storing the communication ID is used in the payload in substitute for the communication ID, this can be reduced to a small data volume, for example, 4 bits. Note that FIG. 2 is merely an example, and the slot ID may be more than 4 bits, and the slot ID of the communication ID slot and the slot ID of the device ID slot may be independent.

Influence Range Information 191

FIG. 3 is a diagram showing an example of the influence range information 191. The influence range information 191 is configured from a plurality of records, and each record is configured from an abnormality code 1911, an abnormality description 1912, an abnormality influence range code 1913, and an influence range 1914. The abnormality code 1911 is a code defined for each type of abnormality that occurs. The abnormality description column 1912 shows the type of abnormality that occurred. The abnormality influence range code 1913 shows the code defined for each range that is influenced by the abnormality that occurred. The influence range 1914 shows the range of influence.

The influence range 1914 is, for example, a communication ID on its own, a combination of communication IDs, all communication IDs to be managed in the information processing device, a network domain, or the overall in-vehicle system. For example, when the power is lost at an unexpected timing, the information processing device 1 identifies the influence range based on the abnormality influence range code 1913 with regard to the abnormality code 1911 of "0x101". Moreover, when it is determined that the abnormality influence range code 1913 is "0xf03", rather than executing the synchronization recovery processing, for example, it would be desirable to switch to a degenerate operation, and safely park the vehicle.

Recency-Related Information 192

Figures 4, 5:
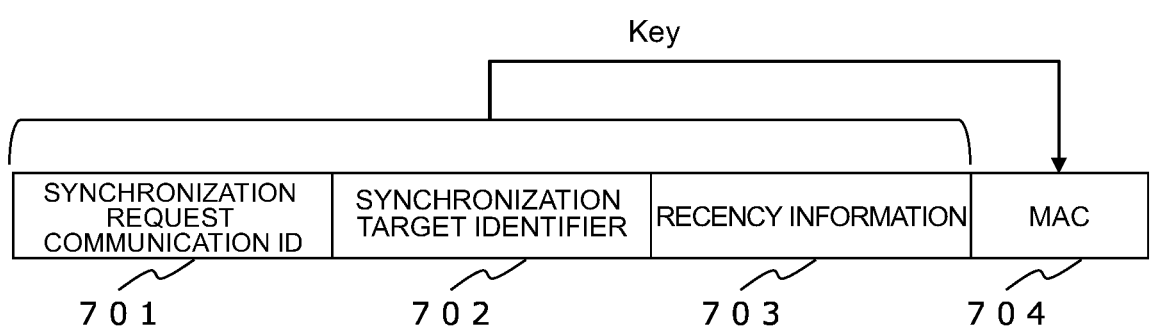
FIG. 4 is a diagram showing an example of the recency-related information 192.
FIG. 5 is a diagram showing an example of the structure of the synchronization request message.

FIG. 4 is a diagram showing an example of the recency-related information 192. The recency-related information 192 includes recency information 1923 for each communication ID 1921. The recency information 1923 is configured from a synchronization counter 1924 and a communication counter 1925. In the example shown in FIG. 4, the upper bit of the recency information 1923 is used as the synchronization counter 1924, and the lower bit is used as the communication counter 1925.

Synchronization Request Message

FIG. 5 is a diagram showing an example of the structure of the synchronization request message generated by the message generation unit 15. The synchronization request message is configured from a synchronization request communication ID 701, a synchronization target identifier 702, recency information 703, and a MAC 704. The synchronization request communication ID 701 is an identifier indicating that it is a communication message for a synchronization request. The synchronization target identifier 702 is an identifier indicating the target to receive this synchronization request message and execute the synchronization recovery processing. The recency information 703 indicates the recency information 1923 updated in step 213, or the synchronization counter 1924 included in the recency information 1923. The MAC 704 is a message authentication code (MAC) calculated using the synchronization request communication ID 701, the synchronization target identifier 702, the recency information 703, and a pre-shared key (not shown). However, the calculated MAC may be used as the MAC 704 as is, or the calculated MAC may be encrypted based on AES 128 or the like and then used as the MAC 704.

Synchronization Target Identifier 702

Figure 6A:
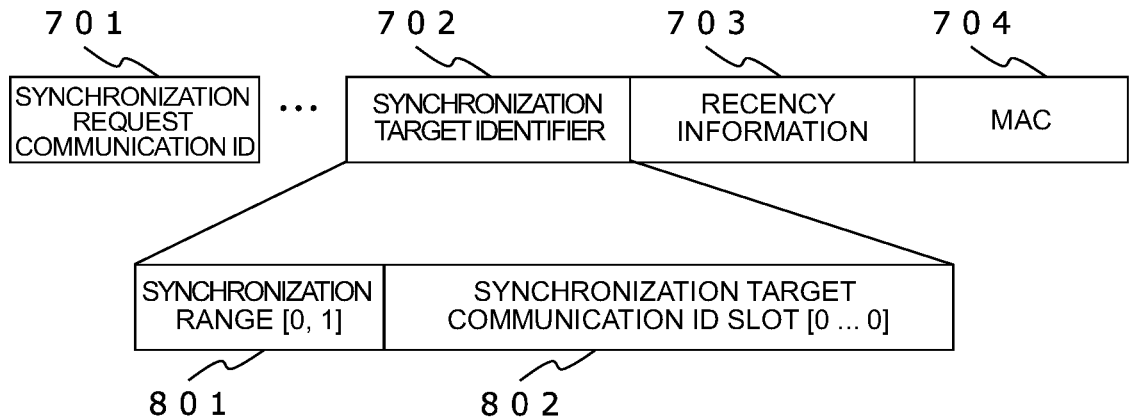
FIGS. 6A and 6B are diagrams showing an example of the data structure of the synchronization target identifier 702.
Figure 6B:
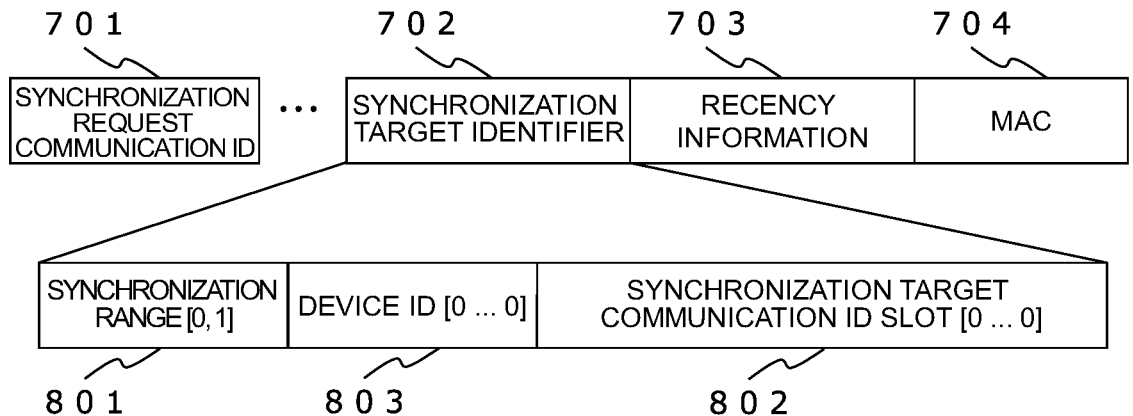

FIG. 6 is a diagram showing an example of the data structure of the synchronization target identifier 702 shown in FIG. 5. FIG. 6A shows an example where the synchronization request communication ID can be assigned to each information processing device, and FIG. 6B shows an example where the synchronization request communication ID cannot be assigned to each information processing device. When the synchronization request communication ID can be assigned to each information processing device, for example, the communication ID of the synchronization request from the first information processing device 1A to the second information processing device 1B, the communication ID of the synchronization request from the first information processing device 1A to the third information processing device 1C, and the communication ID of the synchronization request from the third information processing device 1C to the second information processing device 1B will all be different.

The configuration when the synchronization request communication ID 701 can be assigned to each information processing device is foremost explained with reference to FIG. 6A. In the foregoing case, the ID corresponding to the information terminal device to be synchronized is the synchronization request communication ID 701, the range of recovering the synchronization is the synchronization range 801, and the ID of the slot for identifying the communication ID to be synchronized is the synchronization target slot 802. However, the synchronization range 801 takes on a value of "0" or "1", and the interpretation of the value stored in the synchronization target slot 802 will differ depending on the value of the synchronization range 801.

When the value of the synchronization range 801 is "0", this indicates that the synchronization range is to be set in units of the communication ID, and when the value of the synchronization range 801 is "1", this indicates that the synchronization range is to be set in units of the information processing device of the communication destination. When the value of the synchronization range 801 is "0", information of the slot ID for identifying the communication ID is stored in the synchronization target slot 802. For example, the slot ID of the communication ID slot indicating the communication ID to be synchronized may be stored, or bits indicating whether or not it is a target may be arranged for each slot ID of the communication ID slot. For example, when the communication IDs "0x250" and "0x7ff" are the targets in the example shown in FIG. 2, this may be "2, 4" as the target slot IDs, or this may be "0101" by representing the targets as "1" in the order of slot IDs 1 to 4.

When the value of the synchronization range 801 is "1", the value of the communication ID slot to be synchronized will be "0", and all communication IDs related to the information processing devices indicated by the synchronization request communication ID 701 will be synchronized. The specific communication IDs to be synchronized are determined by the information processing devices 1 that received the synchronization request message.

The configuration when the synchronization request communication ID 701 cannot be assigned to each information processing device is now explained with reference to FIG. 6B. In the foregoing case, the synchronization target identifier 702 is configured from a synchronization range 801, a synchronization target slot 802, and a device ID 803. The device ID 803 stores identifiers capable of differentiating the respective information processing devices. Note that the synchronization target identifier merely needs to be able to identify the corresponding information processing device and communication ID, and may be combined with the synchronization request communication ID 701 as a single identifier.

Communication-Related Information 193

FIG. 7 is a diagram showing an example of the communication-related information 193. The communication-related information 193 indicates the correspondence of the communication ID and the information processing device 1 of the communication destination. The communication-related information 193 is configured from a communication ID 1931, and a communication destination information processing device 1932. The communication ID 1931 stores a communication ID, and the communication destination information processing device 1932 stores the name or the like of the information processing device which transmits/receives a communication message using the communication ID 1931. For example, when the device ID 803 included in the synchronization target identifier 702 indicates "information processing device 1", the information processing device that received the synchronization request message determines that the next communication ID needs to be synchronized. In other words, the three communication IDs of "0x001", "0x010", and "0x014" linked to "information processing device 1" are determined as the synchronization targets.

Processing of Normal Message

The processing of a normal message; that is, any message other than the synchronization request message, is now explained. For example, when the message generation unit 15 of the information processing device 1 is to transmit control data, the message generation unit 15 generates a message including the communication ID, control data, value of the communication counter, and the MAC. The value of the communication counter included in this message corresponds to the communication ID to be transmitted, and is the value stored in the recency-related information 192. However, immediately before the message generation unit 15 reads the value of the communication counter, the recency information management unit 13 increments the value of the communication counter of the communication ID by one.

Moreover, the MAC included in a normal message is the message authentication code calculated by using a pre-shared key (not shown) with that normal message's communication ID, control data, and value of the communication counter as the processing targets. Upon receiving a normal message, the message verification unit 18 and the recency information verification unit 17 of the information processing device 1 confirms the completeness of the message. Once the completeness is confirmed, control using the control data included in the normal message is performed, and, if the completeness cannot be confirmed, that message is discarded. Note that the order of operating the message verification unit 18 and the recency information verification unit 17 is arbitrary, and may be simultaneous. Completeness is confirmed only when it is confirmed that there is no problem based on the verification of the message verification unit 18 and the recency information verification unit 17.

The recency information verification unit 17 reads, from the recency-related information 192, the value of the communication counter corresponding to the communication ID of the received normal message. When the value of the normal counter included in the received normal message is newer; that is, greater than the read value, it is determined that the recency has been confirmed. However, when the difference between the two is greater than a predetermined threshold, it is also possible to determine that the recency has not been confirmed on grounds that an unduly large value has been transmitted.

Verification of the MAC by the message verification unit 18 is performed as follows. The message verification unit 18 foremost calculates the MAC using a pre-shared key (not shown) with the communication ID, control data, and recency information included in the received normal message as the processing targets. Subsequently, the message verification unit 18 determines whether the calculated MAC and the MAC included in the received normal message coincide. The message verification unit 18 determines that there is no problem when the two coincide, and determines that a problem has occurred; that is, that an illegal message has been sent, when the two do not coincide.

Overview of Re-Synchronization Processing

Figure 8:
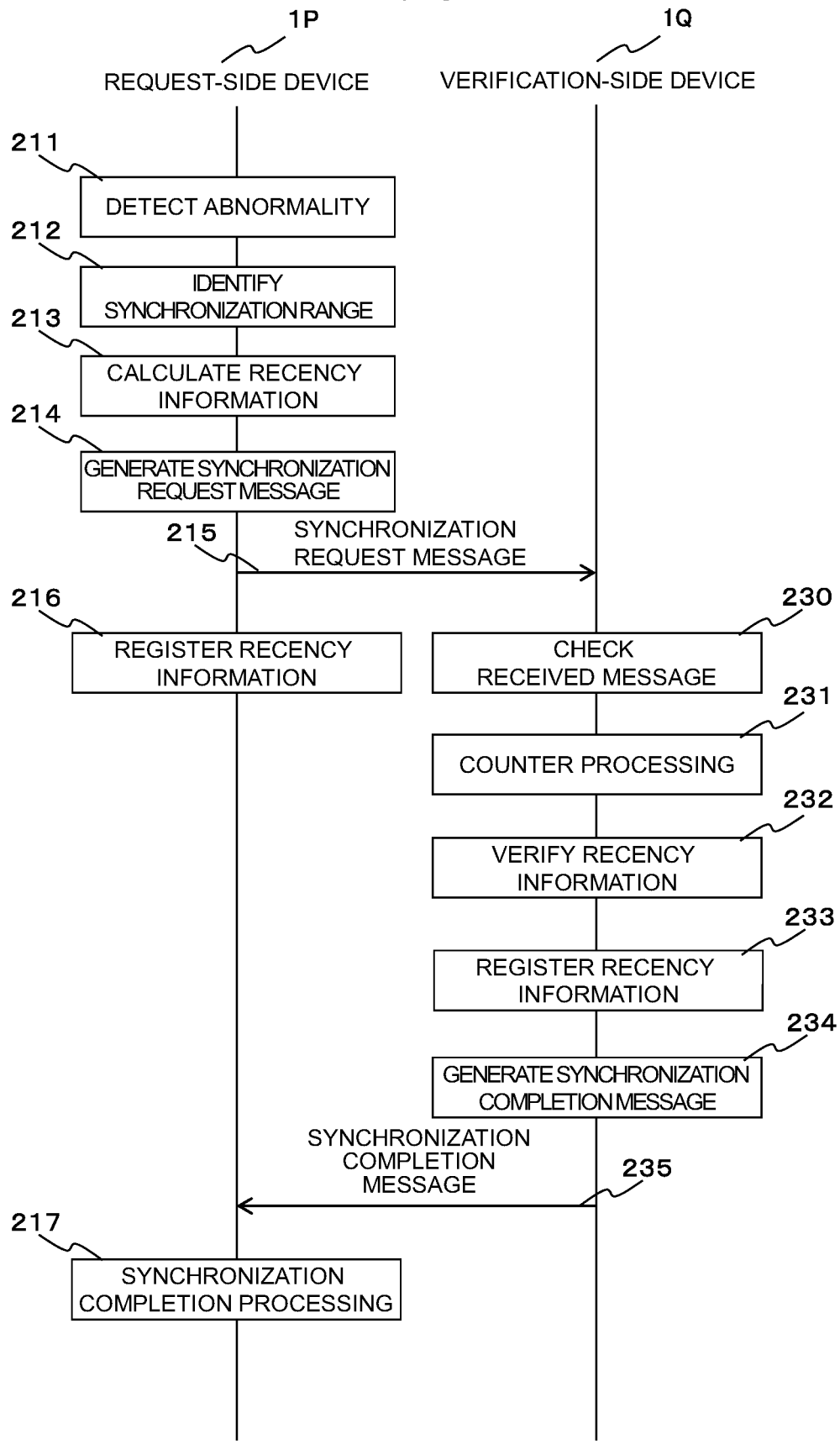
FIG. 8 is a diagram showing a re-synchronization processing sequence of the communication counter value.

FIG. 8 is a diagram showing a re-synchronization processing sequence of the communication counter value between a request-side device 1P and a verification-side device 1Q. Note that the request-side device 1P and the verification-side device 1Q are names used for the sake convenience, and in effect they are one of the information processing devices 1.

In step 211, the abnormality monitoring unit 11 detects an abnormality based on the influence range information 191 generated by the abnormality detection unit 11A, and proceeds to step 212 upon detecting an abnormality. The abnormality monitoring unit 11 may confirm the influence range information 191 at the time that it is activated, or periodically confirm the influence range information 191, or confirm the influence range information 191 each time it is to detect an abnormality.

In step 212, the synchronization range identification unit 12 identifies the synchronization range based on the abnormality influence range code 1913 acquired in step 211. For example, when the abnormality influence range code 1913 is "0xf02", the synchronization range identification unit 12 determines that all communication ID that is is managing will be influenced, and identifies all communication IDs included in the recency-related information 192 as the synchronization range.

In subsequent step 213, the recency information management unit 13 acquires, from the recency-related information 192, the recency information of the communication IDs related to the synchronization range identified in step 212, and the recency information calculation unit 14 calculates new recency information.

For example, when all communication IDs are determined to be the synchronization targets, in step 213, the recency information management unit 13 acquires the synchronization counter 1924 linked to all communication IDs 1921 registered in the recency-related information 192, and the recency information calculation unit 14 calculates new recency information in which the value obtained by incrementing the maximum value by "1" is used as the upper bit. Note that new recency information may be calculated and updated for each communication ID. Since the new recency information calculated here is written in another information processing device 1 based on the synchronization processing, such new recency information may also be referred to as recency information "after synchronization".

In subsequent step 214, the message generation unit 15 calculates the MAC using the recency information updated in step 213 and the synchronization request communication ID, and generates a synchronization request message including the synchronization target identifier, which indicates the target identified as the synchronization target, synchronization request communication ID, recency information, and the MAC. In step 215, the communication unit 10 transmits the synchronization request message generated in step 214 to other information processing devices via the communication bus 2. In subsequent step 216, the synchronization processing control unit 19 registers the recency information calculated in step 213 in the recency-related information 192.

The verification-side device 1Q executes step 230 upon receiving the synchronization request message transmitted by the request-side device 1P in step 215. In step 230, the verification-side device 1Q refers to the synchronization request communication ID 701 and the synchronization target identifier 702 of the received synchronization request message, and determines whether or not synchronization is required. The verification-side device 1Q proceeds to step 231 upon determining that synchronization is required, and ends the processing of FIG. 8 upon determining that synchronization is not required.

In step 231, the verification-side device 1Q performs the following two types of processing as the counter processing. In the verification-side device 1Q, the recency information management unit 13 foremost updates the communication counter acquired from the communication counter 1925 corresponding to the communication ID 1931 according to predetermined rules. Subsequently, the verification-side device 1Q acquires the value of the corresponding synchronization counter 1924, and then proceeds to step 232.

In step 232, the recency information verification unit 17 verifies the recency by comparing the synchronization counter included in the recency information 703 assigned to the received communication message, and the value of the synchronization counter 1924 acquired in step 231. To put it differently, the recency information verification unit 17 confirms whether the value of the synchronization counter included in the received recency information 703 is newer than the value of the synchronization counter 1924. The verification-side device 1Q proceeds to step 233 when the recency has been confirmed, and ends the processing of FIG. 8 when the recency could not be confirmed.

With regard to the verification of the recency, the value of the received recency information 703 can be determined to be the latest value when it is greater than the value of the synchronization counter 1924. Furthermore, the value of the received recency information 703 may be determined to the latest only when the difference between the value of the synchronization counter included in the received recency information 703 and the value of the synchronization counter 1924 is within a predetermined threshold. If the difference between the two exceeds the threshold, it is determined that an illegal counter value has been received, and this processing is ended.

Note that the processing shown in FIG. 8 may also be ended when the message verification unit 18 of the verification-side device 1Q verifies the MAC 704 included in the received message and determines that the values do not coincide. More specifically, the message verification unit 18 calculates the MAC using the value of the synchronization counter included in the recency information 703 in which the recency has been confirmed, the value of the updated communication counter, and the synchronization request communication ID 701. Subsequently, the message verification unit 18 compares the received MAC 704 and the calculated MAC, and proceeds to step 233 when they coincide, and ends this processing when they do not coincide.

In step 233, the synchronization processing control unit 19 stores, in the synchronization counter 1924, the value of the synchronization counter included in the received recency information 703, and stores, in the communication counter 1925, the value of the communication counter updated in step 232. In other words, the value of the synchronization counter 1924 is updated based on the processing of this step. In subsequent step 234, the message generation unit 15 generates a synchronization completion message including the synchronization completion ID and the information processing device ID. In step 235, the communication unit 10 transmits the synchronization completion message generated in step 234 to the other information processing devices via the communication bus 2.

The request-side device 1P executes step 217 upon receiving a synchronization completion message from the verification-side device 1Q. In step 217, the communication unit 10 of the request-side device 1P completes the synchronization recovery processing by using the synchronization processing control unit 19, and switches to the normal mode.

As explained above, the request-side device 1P transmits a synchronization request message to the verification-side device 1Q, and the verification-side device 1Q updates the synchronization counter 1924 and the communication counter 1925 according to predetermined rules. Consequently, the values of the communication counter 1925 are re-synchronized by the request-side device 1P and the verification-side device 1Q. To put it differently, the values of the communication counter 1925 are shared by the request-side device 1P and the verification-side device 1Q.

Details of Synchronization Request Side

Figure 9:
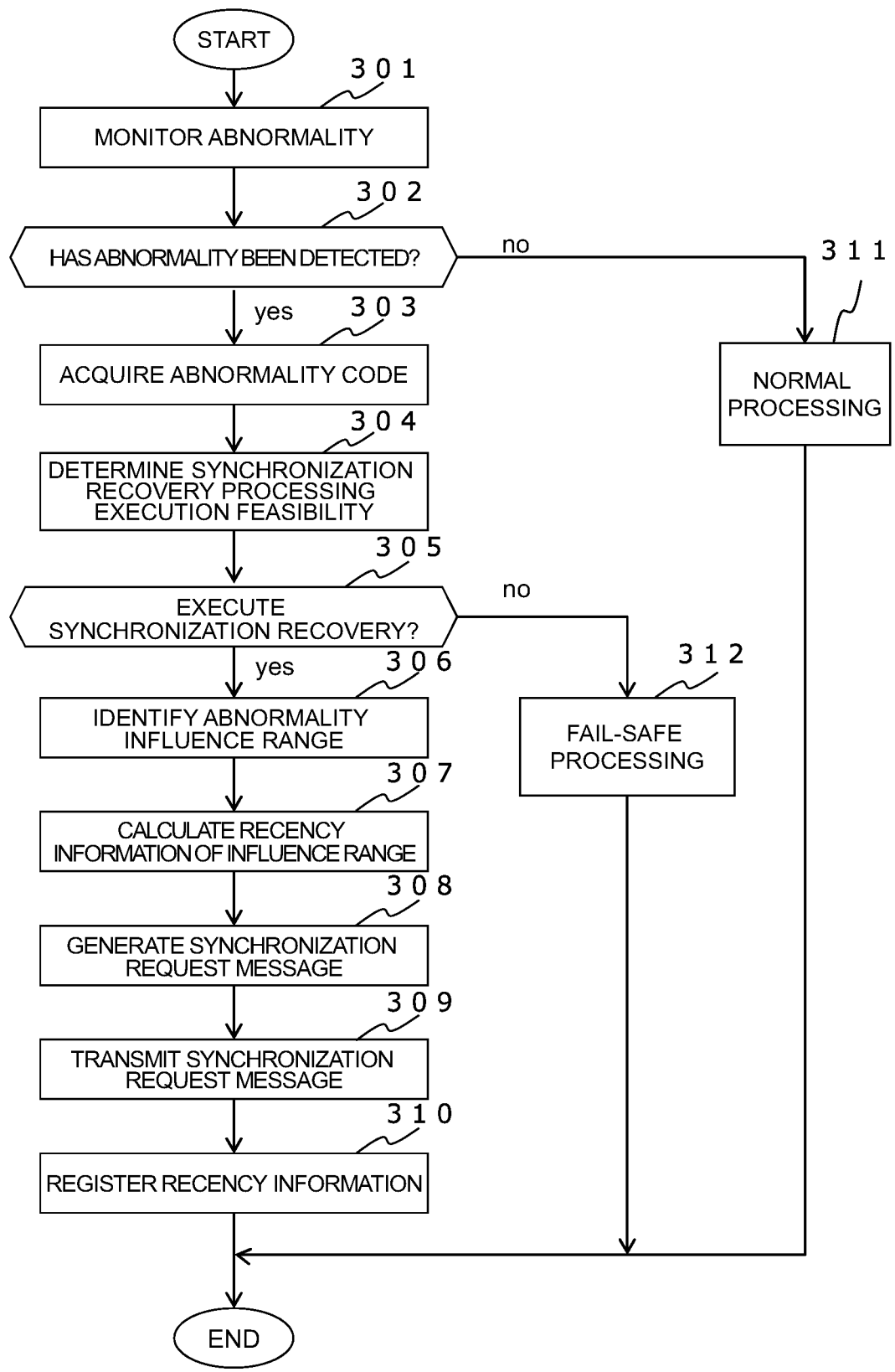
FIG. 9 is a flowchart showing the detailed processing from step 211 to step 216 of FIG. 8.

FIG. 9 is a flowchart showing the detailed processing from step 211 to step 216 of FIG. 8. In step 301, the abnormality monitoring unit 11 monitors whether there is an output from the abnormality detection unit 11A; that is, whether or not an abnormality has occurred. In step 302, the abnormality monitoring unit 11 proceeds to step 303 when an abnormality is detected in step 301, and proceeds to step 311 when an abnormality is not detected. In step 303, the synchronization range identification unit 12 acquires the abnormality code 1911 output by the abnormality detection unit 11A.

In step 304, the synchronization range identification unit 12 refers to the influence range information 191, and acquires the abnormality influence range code 1913 and the influence range 1914 corresponding to the abnormality code 1911 acquired in step 303. Subsequently, the synchronization range identification unit 12 determines whether the synchronization recovery processing can be executed based on the influence range 1914. Specifically, the synchronization range identification unit 12 determines that the synchronization recovery processing cannot be executed when the influence range 1914 cannot be synchronized, and otherwise determines that the synchronization recovery processing can be executed.

In step 305, the synchronization processing execution determination unit 16 proceeds to step 306 when it is determined in step 304 that the synchronization recovery processing can be executed, and proceeds to step 312 when it is determined in step 304 that the synchronization recovery processing cannot be executed. In step 306, the influence range of the specific recency information 1923 is identified based on the influence range 1914 read in step 304. For example, when the influence range 1914 is the communication ID, the communication ID 1921 in which an abnormality has occurred is identified as the influence range. Moreover, for example, when the influence range 1914 is the information processing device, all communication IDs 1921 being managed by that information processing device 1 are identified as the influence range.

In subsequent step 307, the recency information calculation unit 14 calculates new recency information in the influence range identified in step 306. For example, the value obtained by adding "1" to the maximum value of the synchronization counter 1924 in the influence range and setting the value of the communication counter to "0" is used as the new recency information of the communication ID corresponding to the influence range. As described above, since the upper bit of the recency information is the synchronization counter and the lower bit is the communication counter, even when the value of the communication counter is reset to zero, the value of the recency information will increase by increasing the value of the synchronization counter 1924.

In subsequent step 308, the message generation unit 15 generates a synchronization request message. This synchronization request message includes the recency information 703 calculated in step 307, the synchronization request communication ID 701, the synchronization target identifier 702 indicating the synchronization target range, and the MAC 704 calculated based on the foregoing information. In subsequent step 309, the communication unit 10 sends the synchronization request message generated in step 308 to the verification-side device 1Q via the communication bus 2. In subsequent step 310, the synchronization processing control unit 19 registers the recency information calculated in step 307 as the recency information 1923 linked to the corresponding communication ID 1921 of the recency-related information 192.

In step 311 which is executed when a negative result is obtained in the determination of step 302, the synchronization processing control unit 19 continues the normal control processing. In step 312 which is executed when a negative result is obtained in the determination of step 305, the synchronization processing control unit 19 outputs an instruction of switching to the fail-safe mode of being operated with degenerated functions. Based on the foregoing steps, the request-side device 1P transmits, to the verification-side device 1Q, the synchronization request message which is generated when an abnormality is detected. Subsequently, as shown in FIG. 8, as a result of receiving a synchronization completion notice from the verification-side device 1Q, it is possible to confirm that the synchronization was successful.

Details of Synchronization Verification Side

Figure 10:
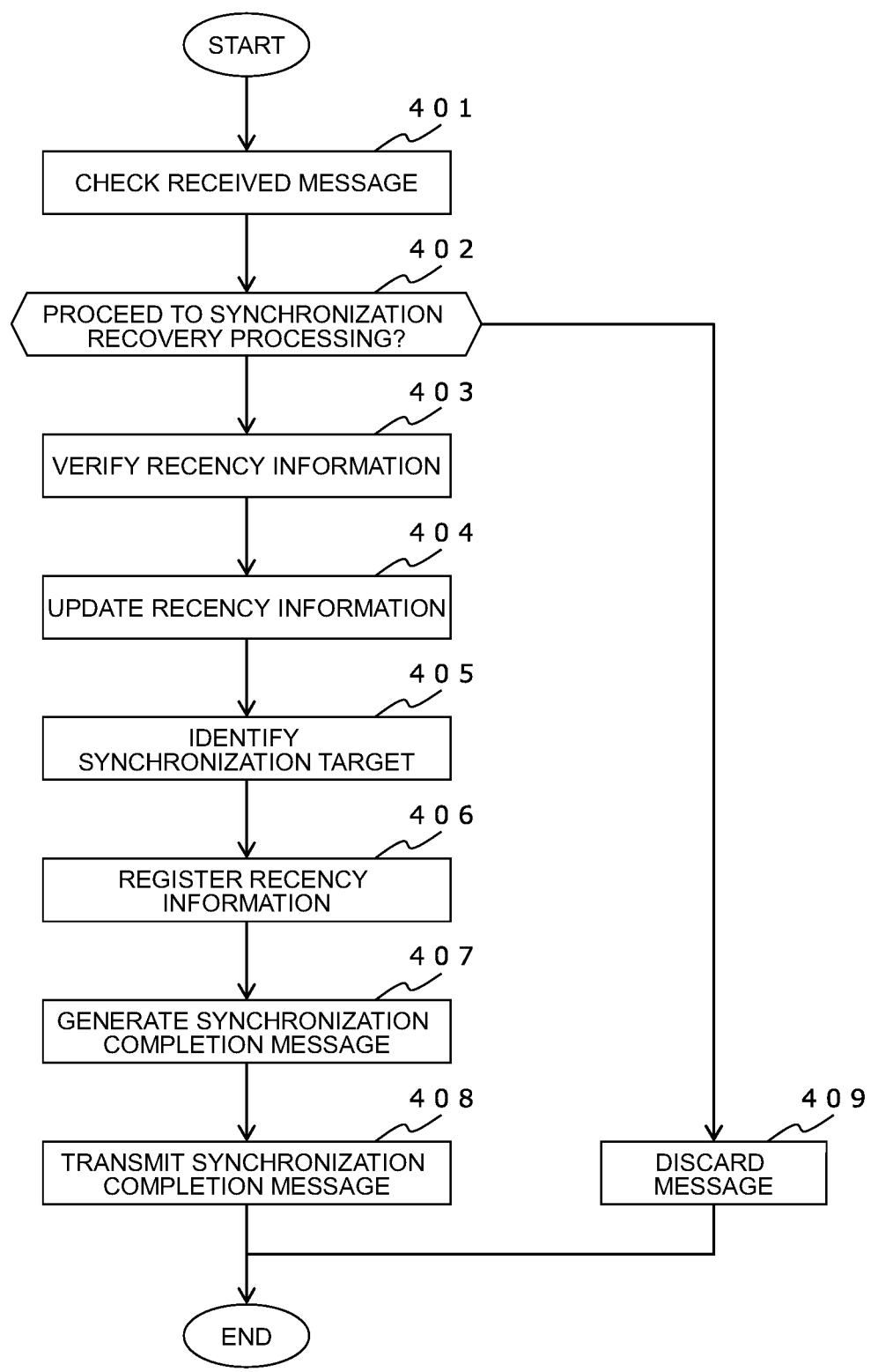
FIG. 10 is a flowchart showing the detailed processing from step 231 to step 235 of FIG. 8.
Figure 1:
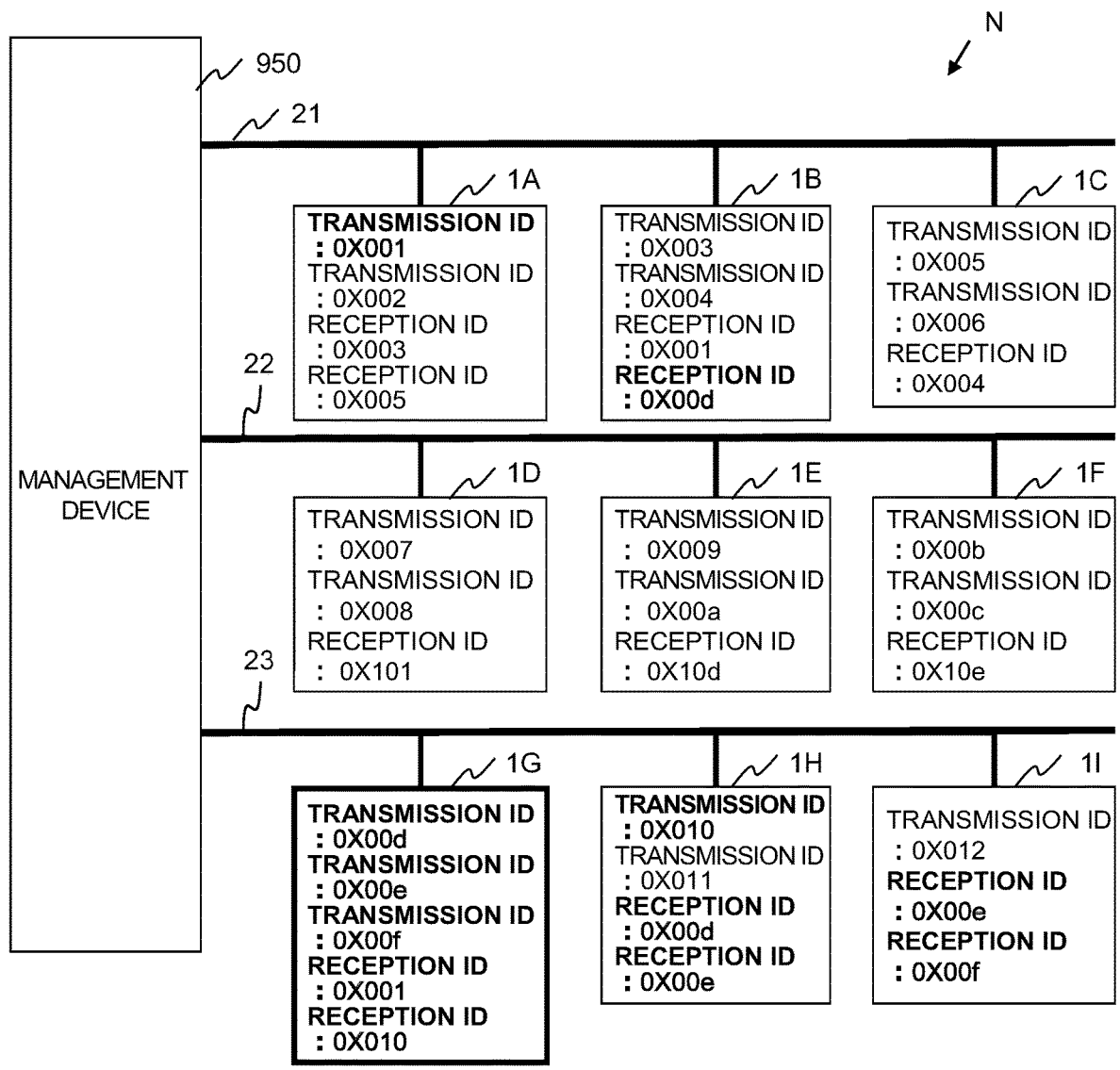

FIG. 10 is a flowchart showing the detailed processing from step 231 to step 235 of FIG. 8. In step 401, the message verification unit 18 confirms the synchronization request message received using the communication unit 10. Specifically, the message verification unit 18 acquires the synchronization target identifier 702 from the received synchronization request message, refers to the communication-related information 193, and verifies whether there is an communication ID corresponding to that synchronization target identifier 702. For example, when the verification-side device 1Q executing the flowchart shown in FIG. 10 is the second information processing device 1B and the communication-related information 193 is the information shown in FIG. 7, whether "0x00d" is included in the communication ID 1931 is verified.

In step 402, the synchronization processing execution determination unit 16 proceeds to step 403 upon determining that there is a communication ID corresponding to the synchronization target identifier 702 based on the verification of step 401, and proceeds to step 409 upon determining that there is no corresponding communication ID.

In step 403, foremost, the recency information management unit 13 updates the value of the communication counter 1925 corresponding to the communication ID 1931 according to predetermined rules. Subsequently, the recency information verification unit 17 acquires the value of the corresponding synchronization counter 1924 and compares it with the synchronization counter included in the recency information 703 assigned to the received communication message. Subsequently, the recency information verification unit 17 confirms whether the value of the synchronization counter included in the received recency information 703 is newer than the synchronization counter 1924.

In step S403, furthermore, the message verification unit 18 calculates the MAC using the value of the synchronization counter included in the recency information 703 in which the recency has been confirmed, the value of the updated communication counter, and the synchronization request communication ID 701. Subsequently, the message verification unit 18 confirms whether the calculated MAC and the received MAC 704 coincide. The message verification unit 18 proceeds to step 409 when it is not possible to confirm that the value of the synchronization counter included in the received recency information 703 is newer than the synchronization counter 1924, or when it is not possible to confirm that the calculated MAC and received MAC 704 coincide, and otherwise proceeds to step 404.

In step 404, the recency information management unit 13 updates the recency information confirmed in step 403 as the new recency information. In subsequent step 405, the synchronization processing control unit 19 identifies the communication ID 1931 identified in step 401 as the synchronization target range. In subsequent step 406, the recency information management unit 13 registers the recency information updated in step 404 as the recency information linked to the communication ID 1931 of the synchronization target range identified in step 405.

In subsequent step 407, the message generation unit 15 generates a synchronization completion message including the synchronization completion ID, and the information processing device ID. In subsequent step 408, the communication unit 10 transmits the synchronization completion message generated in step 407 to the other information processing devices via the communication bus 2, and then ends the processing shown in FIG. 10. In step 409, the synchronization processing control unit 19 discards the received synchronization request message, and then ends the processing shown in FIG. 10.

According to the first embodiment described above, the following effects are yielded.

(1) An information processing device 1 transmits and receives a message to which a communication ID indicating a class has been assigned. The information processing device 1 comprises a a storage unit 19A which stores, for each of the communication IDs, a communication counter 1925 for verifying a recency of a communication, a recency information management unit 13 which updates the communication counter based on a predetermined condition, an abnormality monitoring unit 11 which identifies an influence range of an abnormality that occurred, and a message generation unit 15 which generates a synchronization request message including the communication ID indicating that it is a message requesting a synchronization of the communication counter, and a synchronization target identifier indicating the influence range identified by the abnormality monitoring unit. Thus, it is possible to target only a specific information processing device 1 to be synchronized, and devices that do not need to be synchronized can operate normally.

(2) The storage unit 19 stores influence range information 191 indicating a correspondence of abnormality type and an influence range. The abnormality monitoring unit 11 identifies the influence range based on the identified abnormality type and the influence range information 191. Thus, it is possible to synchronize with a suitable device according to the abnormality type.

(3) The storage unit 19 stores a synchronization counter 1924 used for verifying the synchronization of the communication counter 1925. The recency information management unit 13 decides a value of the communication counter after the synchronization and a value of the synchronization counter 1924 after the synchronization. The synchronization request message includes information indicating the value of the communication counter 1925 after the synchronization and the value of the synchronization counter 1924 after the synchronization. Thus, values of the counters after synchronization can be matched exactly.

(4) When there are a plurality of the communication IDs to be synchronized, the recency information management unit 13 decides the value of the synchronization counter 1924 after the synchronization based on a largest value of the synchronization counter 1924 among values of the synchronization counter 1924 corresponding to the plurality of communication IDs to be synchronized. Thus, synchronization can be performed efficiently.

(5) When there are a plurality of the communication IDs to be synchronized, the recency information management unit 13 adds 1 to a largest value of the synchronization counter 1924 among values of the synchronization counter 1924 corresponding to the plurality of communication IDs to be synchronized and sets an obtained value as the value of the synchronization counter 1924 after the synchronization, and sets the value of the communication counter 1925 after the synchronization to zero.

(6) The synchronization target identifier 702 includes information indicating the communication ID to be synchronized, or information indicating an information processing device in which an abnormality occurred. Thus, since each information processing device 1 that received the synchronization request message can determine whether synchronization is necessary, there is no particular need to change the synchronization request message even when the number of information processing devices 1 connected to the communication bus 2 is increased, and the network configuration can be changed easily.

(7) Upon receiving a message, the recency information management unit 13 increments by one the value of the communication counter corresponding to the communication ID included in the received message. When the communication ID included in the received message is other than the communication ID indicating that it is a message requesting the synchronization of the communication counter, the recency information management unit 13 confirms the recency of the received message by comparing the value of the communication counter 1925 included in the received message, and the value of the communication counter 1925 after being incremented by one with the recency information management unit 13.

Modified Example 1

In the foregoing embodiment, the abnormality detection unit 11A was equipped in the information processing device 1. Nevertheless, the information processing device 1 does not need to comprise the abnormality detection unit 11A, and the abnormality detection unit 11A may also be equipped in another device connected to the communication bus 2. In the foregoing case, the abnormality monitoring unit 11 receives the abnormality code 1911 from the abnormality detection unit 11A equipped in the other device.

Modified Example 2

The communication bus 2 may also be a communication bus which corresponds to a communication protocol other than CAN such as IEEE 802.3, MOST, or FlexRay. When the communication bus 2 corresponds to IEEE 802.3, the communication ID may be combination of a destination IP address and a source IP address, or information included in the payload. For example, the communication ID explained in this embodiment may be included in a specific area of the payload of the packet of IEEE 802.3, and used. In other words, the communication ID is not limited to the information stored in the header part of the communication protocol.

Modified Example 3

The RAM 19B of the information processing device 1 does not need to store slot information. In the foregoing case, the normal message will store a communication ID or a device ID, and not a slot ID.

Modified Example 4

In the foregoing embodiment, the information processing device 1 was mounted on an in-vehicle network. Nevertheless, the mounting site of the information processing device 1 is not limited thereto, and may also be applied to a control system or an information system.

Modified Example 5

Rather than including the value of the communication counter after the synchronization in the synchronization request message, a predetermined value, such as zero, may also be used.

Second Embodiment

The second embodiment of the information processing device is now explained with reference to FIG. 11 to FIG. 13. In the following explanation, the same reference numerals are assigned to the same constituent elements as the first embodiment, and the differences will be mainly explained. If no particular explanation is provided, then it is the same as the first embodiment. This embodiment differs from the first embodiment mainly with respect to the point that a management device exists on the communication bus.

FIG. 11 is a configuration diagram of a network N including the information processing device 1 according to the second embodiment. Connected to the network N are a first information processing device 1A, a second information processing device 1B, a third information processing device 1C, a fourth information processing device 1D, a fifth information processing device 1E, a sixth information processing device 1F, a seventh information processing device 1G, an eighth information processing device 1H, a ninth information processing device 1I, and a management device 950. In the following explanation, when the first information processing device 1A, the second information processing device 1B, the third information processing device 1C, the fourth information processing device 1D, the fifth information processing device 1E, the sixth information processing device 1F, the seventh information processing device 1G, the eighth information processing device 1H, and the ninth information processing device 1I are not differentiated, they will be collectively referred to as the information processing device 1.

The first information processing device 1A, the second information processing device 1B, and the third information processing device 1C are connected to a first segment 21. The fourth information processing device 1D, the fifth information processing device 1E, and the sixth information processing device 1F are connected to a second segment 22. The seventh information processing device 1G, the eighth information processing device 1H, and the ninth information processing device 1I are connected to a third segment 23. The management device 950 is connected to the first segment 21, the second segment 22, and the third segment 23.

The management device 950 transmits a communication message received from a certain segment to another segment. However, the management device 950 decides the segment to which a synchronization request message is to be transmitted based on the contents thereof as described later. In other words, the management device 950 may not transmit a synchronization request message, which coincides with a specific condition, to a certain segment.

In FIG. 11, inside each information processing device 1, a message ID assigned to a communication message to be transmitted by that information processing device 1 is indicated as "transmission ID", and a message ID assigned to a communication message received by that information processing device 1 is indicated as "reception ID". For example, the transmission ID of the first information processing device 1A is "0x001" and "0x002", and the reception ID of the first information processing device 1A is "0x003" and "0x005". Since the information processing device 1 to receive the communication message having an ID of "0x001" transmitted by the first information processing device 1A is the information processing device 1 having a reception ID of "0x001", this information processing device 1 corresponds to the second information processing device 1B and the seventh information processing device 1G.

The management device 950 stores in advance information of the ID of the communication message transmitted and received in the respective segments. However, the management device 950 does not need to store information of the transmission ID and the reception ID in units of the respective information processing devices 1. In FIG. 11, the communication ID to be transmitted and received by the seventh information processing device 1G is indicated in bold letters for explaining the operational example described later.

Configuration of Management Device 950

Figure 12:
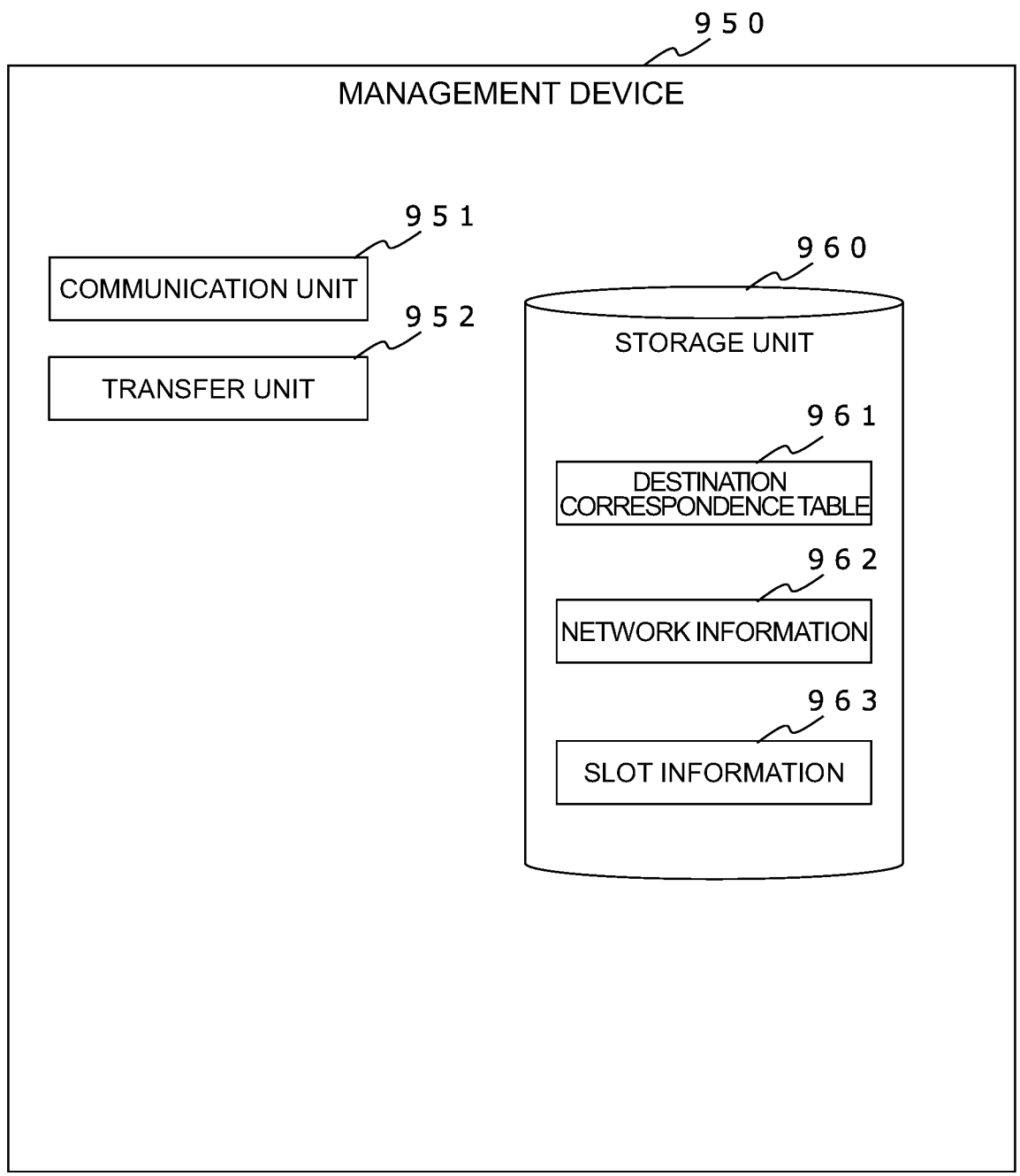
FIG. 12 is a configuration diagram of the management device 950.

FIG. 12 is a configuration diagram of the management device 950. The management device 950 comprises a communication unit 951, a transfer unit 952, and a storage unit 960. The communication unit 951 is, for example, a communication interface corresponding to a CAN, and communicates with the first segment 21, the second segment 22, and the third segment 23. The transfer unit 952 is realized, for example, by a CPU reading a program stored in a ROM not shown into a RAM and executing such program. When the management device 950 receives a synchronization request message from one of the segments, the transfer unit 952 transfers the synchronization request message only to the segment to which belongs the information processing device 1 to synchronize the communication counter based on the synchronization request message. The operation of the transfer unit 952 will be described later.

The storage unit 960 is a non-volatile storage device such as a flash memory, and stores an destination correspondence table 961, network information 962, and slot information 963. The destination correspondence table 961 is information indicating the correspondence of the synchronization request communication ID 701 and the destination information processing device 1 in a case where the synchronization request communication ID can be assigned to each information processing device 1. The network information 962 is the information shown in FIG. 11. In other words, the network information 962 is information of the affiliated segment, transmission ID and reception ID of each information processing device 1. The slot information 963 is information of the slot ID included in the communication message and is, for example, the correspondence of the slot ID and the communication ID of the communication ID slot, and the correspondence of the slot ID and the device ID of the device ID slot shown in FIG. 2.

Operation of Management Device 950

Figure 13:
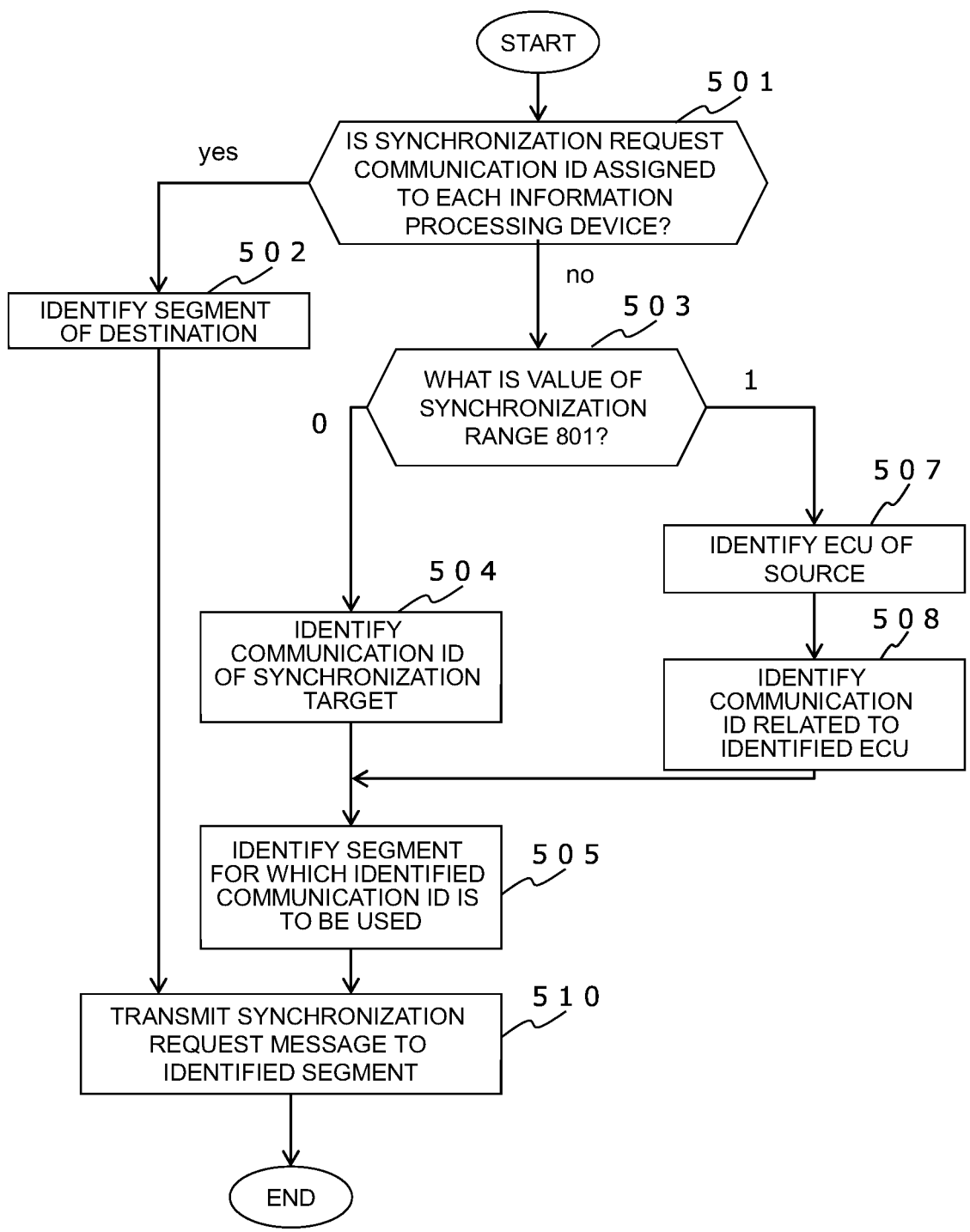
FIG. 13 is a flowchart showing the operation of the transfer unit 952 of the management device 950.

FIG. 13 is a flowchart showing the operation of the transfer unit 952 of the management device 950. In step 501, the management device 950 determines whether the synchronization request communication ID has been assigned to each information processing device. As explained in the first embodiment, whether or not the synchronization request communication ID has been assigned to each information processing device is restricted by the number of available communication IDs and the number of available information processing devices 1 or other factors, and is a matter of design of the network. Thus, whether the synchronization request communication ID has been assigned to each information processing device is decided in advance, and such information is stored in the storage unit 960 of the management device 950. The management device 950 proceeds to step 502 upon obtaining a positive result in the determination of step 501, and proceeds to step 503 upon obtaining a negative result in the determination of step 503.

In step 502, the management device 950 refers to the destination correspondence table 961, and identifies the information processing device 1 corresponding to the synchronization request communication ID 701 included in the received synchronization request message; that is, the information processing device 1 to become the address of that synchronization request message. Furthermore, the management device 950 refers to the network information 962, identifies the segment to which the identified information processing device 1 belongs, and then proceeds to step 510.

In step 503, the management device 950 determines the value of the synchronization range 801 included in the received synchronization request message. The management device 950 proceeds to step 504 upon determining that the value of the synchronization range 801 is "0", and proceeds to step 507 upon determining that the value of the synchronization range 801 is "1". In step 504, the management device 950 interprets the slot ID stored in the synchronization target slot 802 as being the communication slot ID, identifies the communication ID to be synchronized by combining it with the slot information 963, and then proceeds to step 505. For example, when the slot information 963 is the example shown in FIG. 2 and the slot ID stored in the synchronization target slot 802 is "1", the communication ID is identified as being "0x001".

In step 505, the management device 950 identifies the segment to receive the communication ID identified in step 504 or step 508. For example, when the identified communication ID is "0x001", the management device 950 refers to the network information 962 and identifies the segment including the information processing device in which the transmission ID or the reception ID is "0x001". In other words, the first segment 21 to which the first information processing device 1A and the second information processing device 1B belong, and the third segment 23 to which the seventh information processing device 1G belongs, are identified.

In step 507, the management device 950 refers to the device ID 803, identifies the source information processing device 1, and then proceeds to step 505. In subsequent step 508, the management device 950 refers to the network information 962 and identifies the communication ID related to the identified information processing device 1. For example, when the identified information processing device 1 is the seventh information processing device 1G, for example, the five IDs to be transmitted or received by the seventh information processing device 1G shown in FIG. 11 are identified.

In step 510 executed subsequent to step 502 or step 505, the management device 950 transmits the same synchronization request message as the received synchronization request message to the segment identified in step 502 or step 505. However, the management device 950 does not transmit the synchronization request message to a segment that has previous received that synchronization request message.

Operational Example

Explained is an operation of a case where the seventh information processing device 1G detects an abnormal reset operation of itself (seventh information processing device 1G) and transmits a synchronization request message. In this case, the message ID to be transmitted by the seventh information processing device 1G and the ID to be received by the seventh information processing device 1G need to be synchronized. Specifically, the IDs indicated in bold letters shown in FIG. 8 to be transmitted or received by the first information processing device 1A, the second information processing device 1B, the eighth information processing device 1H, and the ninth information processing device 1I need to be synchronized. The synchronization request message transmitted by the seventh information processing device 1G is directly delivered to the eighth information processing device 1H and the ninth information processing device 1I belonging to the same third segment 23. Moreover, this synchronization request message is also received by the management device 950.

The management device 950 performs the processing described above, and identifies the first segment 21 and the third segment 23 in step 502 or step 505. Subsequently, since that synchronization request message was received from the third segment 23 to begin with, in step 510, the management device 950 transmits the synchronization request message only to the first segment 21 upon excluding the third segment 23 from the destination. Thus, since the synchronization request message itself transmitted by the seventh information processing device 1G is not delivered to the second segment 22, the communication volume of the second segment 22 can be reduced.

According to the foregoing second embodiment, the following effects are yielded.

(8) A management device 950 relays a communication of communication segments to which the information processing device 1. A plurality of information processing devices 1 are disposed by being divided into two or more segments. The management device 950 comprises a communication unit 951 which communicates with each of the two or more segments, and a transfer unit 952 which, upon receiving the synchronization request message, transfers the synchronization request message only to the segment to which belongs the information processing device to synchronize the communication counter based on the synchronization request message. Thus, the management device 950 can transmitted the synchronization request message only to the necessary segments, and influence on segments that do not need to be synchronized can be excluded.

In each of the embodiments and modified examples described above, the encryption key and seed used in the respective devices will suffice so as long as they are safely distributed, managed and updated, and they may be distributed and updated at an arbitrary timing such at the time of starting/stopping the engine, at the time of production development, or at the time of maintenance. Each of the embodiments and modified examples described above may be combined with each other. While various embodiments and modified examples were described above, the present invention is not limited to the subject matter thereof. Other modes considered to fall within the technical scope of the present invention are also covered by the present invention.

The disclosure of the following priority application is incorporated herein by reference. Japanese Patent Application No. 2018-196082 (filed on Oct. 17, 2018)

REFERENCE SIGNS LIST

1 . . . information processing device
10 . . . communication unit
11 . . . abnormality monitoring unit
12 . . . synchronization range identification unit
13 . . . recency information management unit
14 . . . recency information calculation unit
15 . . . message generation unit
16 . . . synchronization processing execution determination unit
17 . . . recency information verification unit
18 . . . message verification unit
19 . . . synchronization processing control unit
191 . . . influence range information
192 . . . recency-related information
193 . . . communication-related information
702 . . . synchronization target identifier
703 . . . recency information
950 . . . management device
960 . . . storage unit
961 . . . destination correspondence table
962 . . . network information
963 . . . slot information

The invention claimed is:

1. An information processing device which transmits and receives a message to which a communication ID indicating a class has been assigned, comprising:
a storage unit which stores, for each of the communication IDs, a communication counter for verifying a recency of a communication;
a recency information management unit which updates the communication counter based on a predetermined condition;
an abnormality monitoring unit which identifies an influence range of an abnormality that occurred; and
a message generation unit which generates a synchronization request message including the communication ID indicating that it is a message requesting a synchronization of the communication counter, and a synchronization target identifier indicating the influence range identified by the abnormality monitoring unit, wherein the influence range is related to a communication ID affected by the abnormality.

2. The information processing device according to claim 1,
wherein:
the storage unit additionally stores correspondence information indicating a correspondence of an abnormality type and the influence range; and
the abnormality monitoring unit identifies the influence range based on the identified abnormality type and the correspondence information.

3. The information processing device according to claim 1,
wherein:
the storage unit additionally stores a synchronization counter used for verifying the synchronization of the communication counter;
the recency information management unit decides a value of the communication counter after the synchronization and a value of the synchronization counter after the synchronization; and
the synchronization request message additionally includes information indicating the value of the communication counter after the synchronization and the value of the synchronization counter after the synchronization.

4. The information processing device according to claim 3,
wherein:
when there are a plurality of the communication IDs to be synchronized, the recency information management unit decides the value of the synchronization counter after the synchronization based on a largest value of the synchronization counter among values of the synchronization counter corresponding to the plurality of communication IDs to be synchronized.

5. The information processing device according to claim 3,
wherein:
when there are a plurality of the communication IDs to be synchronized, the recency information management unit adds 1 to a largest value of the synchronization counter among values of the synchronization counter corresponding to the plurality of communication IDs to be synchronized and sets an obtained value as the value of the synchronization counter after the synchronization, and sets the value of the communication counter after the synchronization to zero.

6. The information processing device according to claim 1,
wherein:
the synchronization target identifier includes information indicating the communication ID to be synchronized, or information indicating an information processing device in which an abnormality occurred.

7. The information processing device according to claim 1,
wherein:
upon receiving a message, the recency information management unit increments by one the value of the communication counter corresponding to the communication ID included in the received message; and
when the communication ID included in the received message is other than the communication ID indicating that it is a message requesting the synchronization of the communication counter, the recency information management unit confirms the recency of the received message by comparing the value of the communication counter included in the received message, and the value of the communication counter after being incremented by one with the recency information management unit.

8. A management device which relays a communication of communication segments to which the information processing device according to claim 1 is connected,
wherein:
a plurality of the information processing devices are disposed by being divided into two or more segments;
the management device comprising:
a communication unit which communicates with each of the two or more segments; and
a transfer unit which, upon receiving the synchronization request message, transfers the synchronization request message only to the segment to which belongs the information processing device to synchronize the communication counter based on the synchronization request message.

* * * * *